March 10, 1959  D. D. McNOWN  2,876,981
PILOT OPERATED VALVE
Filed Nov. 26, 1956

INVENTOR.
DARL D. McNOWN
BY Elliott & Pastoriza
ATTORNEYS

United States Patent Office 2,876,981
Patented Mar. 10, 1959

2,876,981
PILOT OPERATED VALVE

Darl D. McNown, Merced, Calif.

Application November 26, 1956, Serial No. 624,286

1 Claim. (Cl. 251—41)

This invention generally relates to a fluid valve and more particularly to a valve for connection in a fluid line, the valve being constructed such that it may be remotely controlled by auxiliary or pilot valve means.

While the valve mechanism of the present invention is most advantageously employed in irrigation and sprinkler systems, its operating features are such that it may be applied to other fluid systems in which remotely actuated valves are desirable. For example, this improved valve will be useful in various chemical processing plants, oil refineries, food processing plants, and other diverse applications wherever fluid lines are present which must be opened or closed at different times.

At the present time a variety of remotely controlled valves are available on the market, including several different types of pilot operated valves. However, most of the pilot operated valves available on the market are of relatively complex construction requiring many operating parts and correspondingly expensive manufacturing costs. In addition, many of the valves presently available of the pilot operated type oftentimes have a tendency to clog or become inoperable after a short period of usage.

It is, therefore, an object of the present invention to provide a pilot operated valve, which is simply constructed and requires a minimum number of working parts.

Another object of the present invention is to provide a pilot operated valve which is substantially maintenance free and yet which is susceptible of relatively economical mass production.

A still further object of the present invention is to provide a pilot operated valve which is designed such that its overall dimensions are not appreciably greater than the fluid line to which it is adapted for connection, and yet in which resistance to such fluid flow is minimized.

Another important object is to provide a valve of the above type in which opening and closing thereof is effected without any metal to metal frictional contact.

These and other objects and advantages of the present invention are generally attained by providing a pilot operated valve having a casing or hollow valve body with associated inlet and outlet ports. Disposed within the casing are inner wall means which define together with the casing a first chamber. The first chamber has one portion in communication with the inlet port and another portion opening into the interior of the casing to terminate in a main valve seat.

Supported within the casing are valve means which are adapted for actuation by fluid pressure to open and close the valve seat. In addition, flexible closure means are secured within the casing in a manner such that the closure means and the casing co-operatively define a second chamber. In a preferred construction, the flexible closure means comprise a diaphragm or similar member capable of limited flexure movement.

Connecting through the casing with the second chamber is an auxiliary or first fluid passage means, which in a preferred construction, includes a pilot valve. Coupling means are provided within the casing for joining together the closure means and valve means into a structure whereby the valve means is actuated in response to the movement of the closure means or diaphragm member employed.

In a preferred embodiment, the pilot actuated valve includes a second fluid passage means of restricted cross section which extends through the valve means and through the closure means to thereby enable restricted fluid flow from the first chamber to the second chamber within the casing.

A better understanding of the present invention will be had by reference to the accompanying drawings, showing a preferred embodiment, in which.

Figure 1:
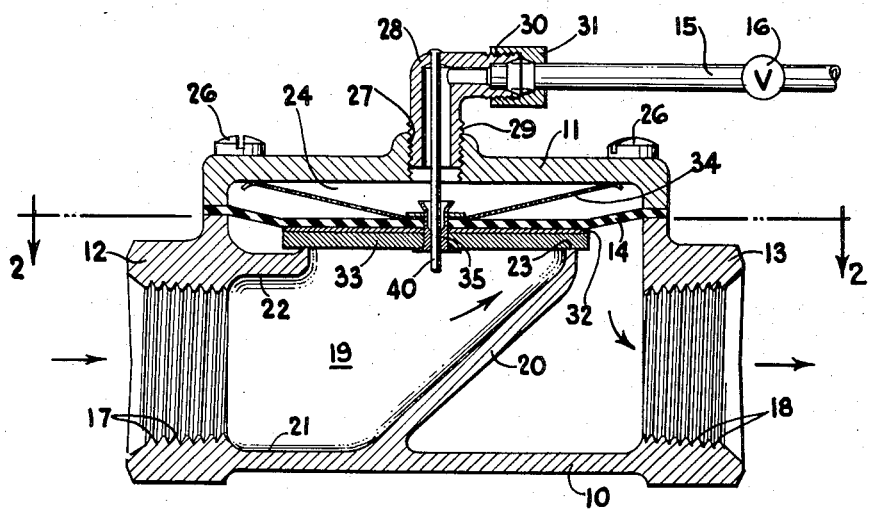
Figure 1 is a sectional view through the pilot operated valve according to the present invention.

Referring now to the drawings, there is shown in Figure 1 a pilot operated valve according to the present invention including a valve body 10 having its upper portions sealed with a cover plate 11. The cover plate is generally rectangular in shape and is adapted to mate with the upper flanged face of the valve body 10 shown more clearly in the view of Figure 2. The valve body 10 includes a conventional inlet port 12 and an outlet port 13 for the passage of fluid therethrough in the direction of the arrows as shown in Figure 1. Interposed between the cover plate 11 and the valve body 10 is a flexible closure means in the form of a diaphragm 14. In communication with the interior of the valve body 10 is a first fluid passage means in the form of a fluid line 15 including a pilot valve schematically indicated at 16.

The invention will be more readily understood by describing the detailed structure of the valve body 10. The inlet port 12 is provided with threading 17 adapted to engage similar threading on conventional piping; correspondingly, the outlet port 13 is provided with threading 18 for securing to piping. A semi-conical chamber 19 is formed within the valve body 10, as defined by an inner wall 20 merging into side walls 21 and 22 of the valve body. The chamber 19 opens at one portion to the inlet port 12 and is opened at another portion to form a valve seat 23, more clearly shown in the view of Figure 2.

In the view of Figure 1, the valve seat 23 is closed off so that fluid flowing in the direction of the arrows is prevented from passing through the valve or out of the semi-conical chamber 19. It will also be noted in the view of Figure 1 that the flexible closure member or diaphragm 14 is angulated downwardly and defines together with the cover plate 11 an upper chamber 24 within the valve body 10.

Figure 2:
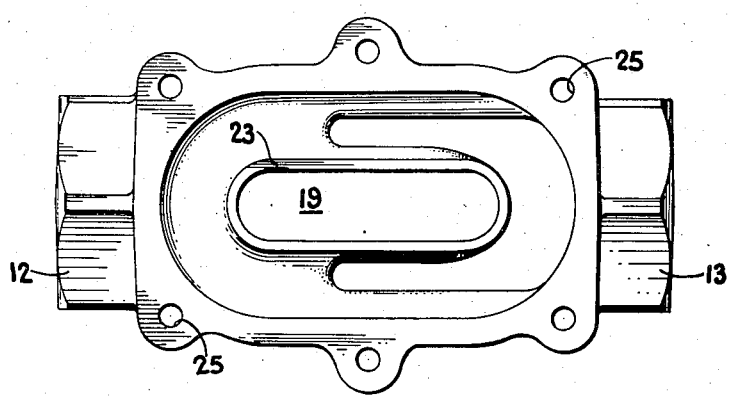
Figure 2 is a plan view taken in the direction of the arrows 2—2 of the valve of Figure 1; and, Figure 3 is an enlarged view of the coupling means shown in Figure 1 joining together the flexible closure means of Figure 1.

As shown in Figure 2, the flanged face of the valve body 10 includes a plurality of bores 25, which are adapted to receive screws 26. The screws 26 pass downwardly through aligned apertures (not shown) in the cover plate 11 and diaphragm 14 into the bores 25 to securely seal the cover plate 11 to the valve body 10. In addition, a threaded opening 27 is centrally provided in the cover plate 11, into which is connected an elbow fitting 28 provided with threads 29 at one end. The other end of the fitting 28 is provided with threads 30, whereby the fitting 28 may be connected to the line 15 by means of a connector 31 or the like.

The closure member or diaphragm 14 is secured between the cover plate 11 and the flanged face of the valve body 10. Disposed immediately below the diaphragm 14 is a backing plate 32, to which is attached a valve member 33. The backing plate 32 and valve 33 are dimensioned similarly to cover the opening formed by the seat 23. Spring means preferably in the form of a flat spring 34, is interposed between the bottom surface of the cover plate 11 and the diaphragm 14 resulting in a biasing force on the diaphragm 14 in a downward direction.

Figure 3:
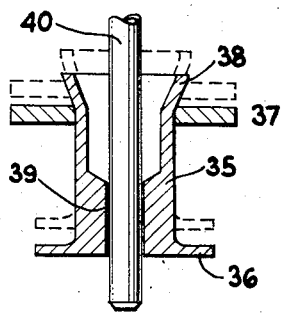

As will be noted from Figure 1, the diaphragm 14, the backing plate 32, the valve 33, and the spring means 34 are joined together with a coupling means in the form of a rivet-like sleeve 35, the construction of which is more clearly shown in the view of Figure 3. The sleeve 35 includes a flanged lower end 36 positioned immediately adjacent the bottom surface of the valve 33. In correspondence, a washer 37 is disposed adjacent the upper end 38 of the sleeve 35 immediately above the spring 34. The washer 37 may be securely retained on the sleeve 35 as by bending back the upper portion 38 of the sleeve 35 as shown. It is evident with such a construction that the valve 33, the backing plate 32, the diaphragm 14, and the spring 34 must each be provided with a central aperture through which the sleeve 35 passes to secure the respective members between the bottom flange 36 and the washer 37.

In addition, the sleeve 35 is provided with an inner passage 39 near its lower end within which is axially disposed an elongated member or pin 40. The pin 40 may be rigidly secured to the fitting 28, as shown in Figure 1, or otherwise attached to the valve body 10 or cover plate 11 in fixed relationship. The pin 40 has a cross sectional area slightly less than the cross sectional area of the passage 39, whereby limited flow may occur in the annular space between the side walls of the passage 39 and the outer surface of the pin 40.

The operation of the improved pilot actuated valve according to the present invention may be clearly understood by considering its application, for example, in a sprinkling system. When the sprinkling system is not being operated, the valve 33 would normally be seated against the valve seat 23 preventing flow through the valve body 10, in the position as shown in Figure 1. According to the watering requirements, at some given time the pilot valve 16 is opened in response to movement of a clock device, or the like, at which time the pressure in chamber 24 is relieved and the pressure of the fluid flowing into the chamber 19 forces the valve 33 off the seat 23 and correspondingly moves the diaphragm 14 upwardly into the chamber 24. The fluid then flows through the chamber 19, out through the valve seat 23 opening, and thereafter down and out through the outlet port 13 in a direction indicated by the arrows of Figure 1.

At a subsequent time, a particular actuating device closes the pilot valve 16, which causes a gradual pressure build up within the chamber 24. In this regard, upon closing of the valve 16, fluid will continue to pass from the chamber 19 out through the outlet port 13 as well as into the chamber 24 by way of the annular opening about the pin 40. However, as pressure builds up in the chamber 24, the diaphragm 14 will be gradually urged downwardly in view of the unbalanced downward force resulting from the spring 34. It will be noted that as the valve 33 finally seats on the valve seat 23 flow will still continue from the chamber 19 into the chamber 24 through the passage 39 (shown in Figure 3) until the fluid pressure in the chamber 24 is the same as the pressure in the chamber 19. At such time, however, the valve 33 will be firmly seated on the valve seat 23 because of the force differential caused by the biasing force of the spring 34. In addition, once the valve is seated the pressure in chamber 24 will act on the entire area on the upper side of the diaphragm while the pressure in chamber 19 can only act on that area of the underside of the diaphragm defined by the periphery of valve seat 23. Since this former area is larger than the latter area, the valve will also be held down by the correspondingly larger hydraulic force on the upper side of the diaphragm.

Upon re-opening of the pilot valve 16, and corresponding relief of the pressure in the chamber 24, the spring means 34 is designed such that its tension is not sufficient to balance the fluid pressure imposed on the valve 33, whereby the valve 33 is forced to move upwardly from the seat 23 and again enable flow through the valve body 10 in the direction of the arrows.

An important feature of the present invention resides in providing the pin 40 axially disposed within the restricted passage 39. It has been found in prior art valve devices that restricted passages oftentimes have a tendency to become clogged with foreign matter suspended in the particular fluid employed with resultant maintenance expenses. In the present invention, the pin 40 serves as a means of preventing clogging in the passage 39 in view of the relative movement between the coupling means or sleeve 35 and pin 40 as the sleeve 35 moves upwardly and downwardly in response to opening and closing of the valve.

It should also be noted that movement of the diaphragm and valve between the open and closed position is effected without any metal to metal engagement, whereby friction in operation is minimized.

It will be apparent, of course, that changes and modifications may be made in the preferred embodiment shown and described without departing from the spirit and scope of the invention. It is evident, therefore, that the improved pilot operated valve of the present invention enables a simplified valve construction adapted for trouble-free use and economical manufacture.

What is claimed is:

A pilot controlled valve comprising, in combination: a casing structure having an inlet port in one end; wall means forming a smooth continuation of said inlet port and terminating in said casing in an oblong valve seat; a flexible diaphragm extending across said casing and having its peripheral edges secured to said casing; a flat member secured directly to the central portion of the underside of said diaphragm in a position to seat on said valve seat and leave a marginal area of said diaphragm exposed adjacent the entire periphery of said valve seat, the interior region of said wall means under said flat member constituting a first chamber normally subject to fluid pressure greater than atmospheric pressure, the region above said diaphragm and the upper portion of said casing structure constituting a second chamber; an outlet port in communication with the region in said casing exterior of said wall means below said diaphragm whereby lifting of said diaphragm and flat member from said valve seat places said inlet port and first chamber in communication with said outlet port; a small fluid passage in the center portion of said diaphragm and flat member placing said first chamber in communication with said second chamber; a pin member rigidly secured to the upper end of said casing and axially extending through said fluid passage, said pin member having a diameter less than the diameter of said fluid passage; a leaf spring disposed between the upper portion of said casing structure and the top of said diaphragm urging said flat member onto said valve seat; and a control fluid passage passing from said second chamber to the exterior of said casing, said control fluid passage including a pilot valve for periodically opening said second chamber to atmospheric pressure, the transverse outside dimensions of said casing being less than twice the inside diameter of said inlet and outlet ports.

References Cited in the file of this patent

UNITED STATES PATENTS

| | | |
|---|---|---|
| 1,851,062 | Protzer | Mar. 29, 1932 |
| 1,877,780 | Ackerman | Sept. 20, 1932 |